United States Patent Office 3,083,191
Patented Mar. 26, 1963

3,083,191
EMULSION POLYMERIZATION OF CONJUGATED DIENES IN THE PRESENCE OF ACYL-CONTAINING DIAZOTHIOETHERS
Carl A. Uraneck and Ollie G. Buck, Bartlesville, Okla., assignors to Phillips Petroleum Company, a corporation of Delaware
No Drawing. Filed Mar. 30, 1959, Ser. No. 802,616
19 Claims. (Cl. 260—84.3)

This invention relates to the new and useful polymer compositions and method of preparing said compositions. In one aspect it relates to polymer compositions containing terminal reactive groups prepared by polymerizing a conjugated diene alone or in admixture with a copolymerizable vinylidene monomer in the presence of a diazothioether. In another aspect the invention relates to polymer compositions obtained by further reacting the terminally reactive polymers with a polyfunctional organic compound.

As used herein the term "terminally reactive polymer" designates polymer which contains a reactive group at each end of the polymer chain.

As used herein the term "polyfunctional organic compound" designates a compound which is capable of reacting with at least two reactive terminal groups.

It is an object of this invention to provide new and useful polymeric materials and process for their preparation.

Another object of this invention is to provide terminally reactive polymers having improved properties.

Still another object of this invention is to provide polymers having improved properties prepared by reacting terminally reactive polymeric materials with a polyfunctional compound.

These and other objects of the invention will become more readily apparent from the following detailed description and discussion.

The foregoing objects are realized broadly by preparing polymers by emulsion polymerization in the presence of a diazothioether and recovering a terminally reactive polymer.

In one aspect of the invention the terminally reactive polymers are reacted with a polyfunctional organic compound to obtain improved polymers.

In still another aspect of the invention reaction of the terminally reactive polymer with the polyfunctional compound is carried out in the presence of a conventional curing system.

It has now been discovered that new and useful polymeric materials can be prepared by the emulsion polymerization of polymerizable monomers in the presence of diazothioethers to polymers which contain reactive groups at the ends of the polymer chain and double bonds within the polymer chain. It has also been discovered that new and useful polymers can be obtained by reacting the terminally reactive polymer with an organic polyfunctional compound.

The term "emulsion" as used herein is to be construed in its broadest sense, that is, as denoting the presence of an aqueous phase and an oil phase without regard to the extent of dispersion of one in the other. Emulsion polymerization is carried out in an aqueous dispersion, that is, the monomers are dispersed in water, usually with the aid of a dispersing or emulsifying agent and agitation. Emulsifying agents which are suitable for this purpose include partially or completely neutralized fatty acid soaps, sodium lauryl sulfate, sodium isobutylnaphthalene sulfonate, sulfated and sulfonated succinic esters and the like.

The monomers which can be employed in the preparation of the terminally reactive polymers of this invention include the conjugated dienes, preferably those containing from 4 to 12 carbon atoms and more preferably those containing from 4 to 8 carbon atoms. Illustrative examples of suitable conjugated dienes are 1,3-butadiene, isoprene, piperylene, methylpentadiene, 2,3-dimethyl-1,3-butadiene, phenylbutadiene, 3,4-dimethyl-1,3-hexadiene, 4,5-diethyl-1,3-octadiene, etc. In adidtion conjugated dienes containing reactive substituents along the chain can also be employed, such as for example, halogenated dienes, such as chloroprene, etc. Of the conjugated dienes the preferred material is butadiene, with isoprene and piperylene also being especially suitable. In addition to homopolymers of conjugated dienes the polymers of the invention also include copolymers of conjugated dienes with copolymerizable vinylidene monomers. Comonomers which can be employed are aryl-substituted olefins such as styrene, various alkyl styrenes, paramethoxystyrene, vinylnaphthalene, vinyltoluene and the like; heterocyclic nitrogen-containing monomers such as pyridine derivatives and quinoline derivatives containing at least one vinyl or alpha methyl vinyl group such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.; similar mono- and di-substituted alkenyl pyridines and like quinolines; acrylic acid esters such as methyl acrylate, ethyl acrylate; alkacrylic acid esters such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.; monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The diazothioethers which are employed in carrying out the invention are selected from those materials having the formula

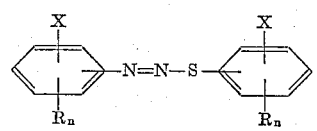

where X is a radical selected from the group consisting of carboalkoxy, acyl, hydroxy, carboxy, halo, nitro and sulfo radicals, each X contains not more than 10 carbon atoms and the X's can be like or unlike; R is an alkyl group containing from 1 to 3 carbon atoms and n is an integer from 0 to 2. Some examples of diazo ethers which can be employed are ([3-acetylphenyl] azo) 3-acetylphenyl thioether; ([4-carboxyphenyl] azo) 4-carboxyphenyl thioether; ([3-hydroxy-2,4-dimethylphenyl] azo) 4-hydroxy-2-methylphenyl thioether; ([4-carbethoxyphenyl] azo) 2-carbmethoxyphenyl thioether; ([4-chloro-2,4-di-n-propylphenyl] azo) 4-chloro-2-ethylphenyl thioether; ([4-sulfophenyl] azo) 2-methyl-4-sulfophenyl thioether; ([4-nitro-2,5-diethylphenyl] azo) 3-nitro-2-ethylphenyl thioether; ([3-caprylphenyl] azo) 3-caprylphenyl thioether; ([4-nitro-2,3-di-n-propylphenyl] azo) 2-ethyl-4-carbnonoxyphenyl thioether; ([2-methyl-3-ethyl-4-carboxyphenyl] azo) 4-caprylphenyl thioether; ([2-chlorophenyl] azo) 4-n-propyl-3-carbnonoxyphenyl thioether; ([2,4-diethyl-3-hydroxyphenyl] azo) 2-n-propyl-4-sulfophenyl thioether; and ([4-methyl-3-enanthylphenyl] azo) 3-ethyl-2-pelargonylphenyl thioether. These compounds can be obtained by diazotizing a suitable aromatic amine and coupling the diazotized amine with the desired substituted phenyl mercaptan (thiophenol).

The diazothioether compound initiates and modifies the polymerization reaction whereby the X radical becomes attached to each end of the polymer chain. It is also within the scope of the invention to convert the X groups at each end of the polymer chain to other X groups, for example, hydrolyzing ester end groups to carboxyl end

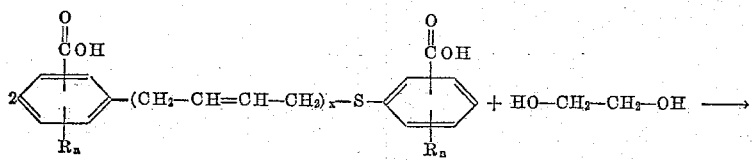

groups. The general reaction can be illustrated graphically as follows:

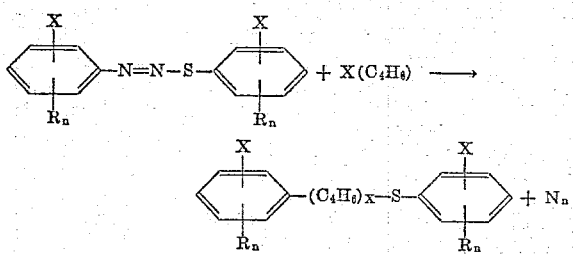

The type and amount of diazothioether used will depend upon the desired molecular weight and the desired reactive end groups in the final polymer composition. Generally in the range of between about 0.05 and about 5.0 parts by weight of diazothioether is employed per 100 parts of the monomer or monomers present. In addition the type of diazothioether and emulsifying agents employed will determine the optimum pH of the reaction mixture. Usually a pH of from about 4 to 12 is desired. Preparation of the terminally reactive polymer is generally carried out at a temperature in the range of between about 10 and about 175° F. and preferably from about 40 to about 140° F. The particular temperatures employed will depend both on the monomers and the initiators used in preparing the polymers. In a preferred method of operation the diazothioether will serve both as the initiator and the modifier although in some cases a supplemental initiator can be used; however, auxiliary modifiers should not be used. It is within the scope of the invention to charge the diazothioether incrementally to the reaction or all of this material can be added before polymerization.

In accordance with one aspect of this invention the terminal reactive polymers prepared with the diazothioethers are reacted with or coupled by means of an organic polyfunctional compound. The polymers of this invention contain two terminal reactive groups, therefore the preferred polyfunctional compounds are those which are bifunctional, namely, containing two functional groups. In general polyfunctional alcohols, acids, halides, amines, ketones, diisocyanates, and the like are employed. The organic radicals of the organic polyfunctional compounds are preferably selected broadly from aliphatic, cycloaliphatic and aromatic hydrocarbon radicals. The reaction with polyfunctional compounds can be illustrated by the following specific example:

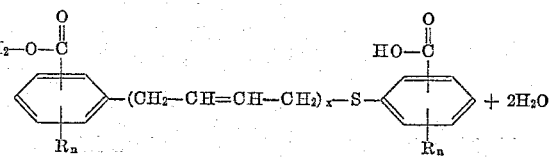

Examples of specific polyfunctional compounds which can be employed are: ethylene glycol, propylene glycol, decylene glycol, dihydroxybenzene, dihydroxycyclohexane, 1,4-di(hydroxyethyl)benzene, glycerol, 1,2,3-trihydroxybutane, erythritol, mannitol, aminophenol pyrocatechol, resorcinol, pyrogallol, oxalic acid, malonic acid, succinic acid, adipic acid, sebacic acid, phthalic acid (o, m and p), cyclohexane dicarboxylic acid, pyridine dicarboxylic acid, naphthalic acid, fumaric acid, the anhydrides of the above listed acids, methylene chloride, 1,2-dibromoethane, 1,4-dichlorobutane, dibromobenzene, 4-bromobenzyl bromide, dichlorocyclohexane, 1,4-dichloronaphthalene, ethylenediamine, pentamethylenediamine, 1,8-diamino-3-octene, 1,4-diaminobenzene, 1,3-diaminocyclohexane, 4-aminobenzylamine, 1,4-diaminonapthhalene, 4-(aminoethyl)aniline hydroquinone, 1,4-bis(acetyl)butane, 1,5-bis(propionyl)-pentane, 1,4-bis(acetyl)cyclohexane, alpha,alpha'-bis(acetyl) xylene, butane-1,4-diisocyanate, octane-1,8-diisocyanate, cyclohexane-1,4-diisocyanate, benzene-1,4-diisocyanate, butane-14-disulfonic acid, hexane-1,6-disulfonic acid, decane-1,10-disulfonic acid, cyclohexane-1,4-disulfonic acid, benzene-1,4-disulfonic acid, 1,4-di(sulfoethyl)benzene, 2-(3-sulfophenyl)propane sulfonic acid, hydrazides of mercapto-substituted aliphatic acids preferably containing from 2 to 30 carbon atoms, such as 2-mercaptoacetohydrazide, 3-mercaptovalerohydrazide, 5-mercaptocaprohydrazide, 10-mercaptomyristohydrazide, 18-mercaptoarachiodohydrazide and 12-mercaptostearohydrazide, semicarbazides and thiosemicarbazides containing from 1 to 10 carbon atoms such as semicarbazide, thiosemicarbazide, 1-phenylsemicarbazide, 2-phenylthiosemicarbazide, 2-ethylsemicarbazide, 2-n-decylthiosemicarbazide, 4-n-butylsemicarbazide, 4-n-butyl-2-ethylthiosemicarbazide, and the like.

In connection with the semicarbazides, an aldehyde containing from 1 to 7 carbon atoms, inclusive, is employed. Some examples of suitable aldehydes include formaldehyde, acetaldehyde, propionaldehyde, enanthaldehyde, furaldehyde, benzaldehyde, and the like. The amount of aldehyde can vary but is usually between about 1.5 and about 10 mols per mol of semicarbazide.

In addition to the foregoing it is within the scope of the invention to react the terminally reactive polymer with a like or unlike terminally reactive polymer having different reactive groups as typified by the following specific reaction.

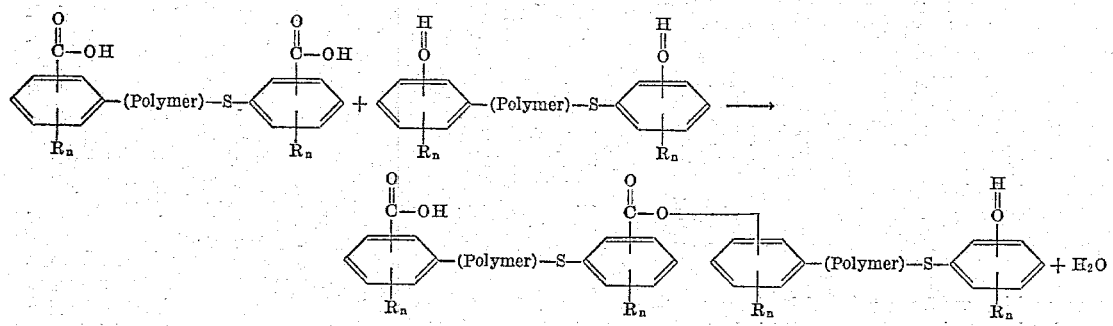

Reaction of the terminally reactive polymer with the polyfunctional organic compounds can be carried out over a range of temperature generally between about —100 and about +350° F. and more usually between about 0 and about 250° F. The time employed in carrying out the reaction will vary depending upon the particular materials being reacted and is usually less than two hours. The quantity of polyfunctional organic reactant employed in carrying out the reaction is usually between about 0.5 to 1 and about 5 to 1, equivalents based on the original diazothioether charge. The reaction mechanism comprises reaction of the polyfunctional organic compound with functional groups at the ends of the polymer chain and with the double bond and/or other functional groups within the polymer molecules. For example, cross-linking of polymer molecules containing terminal ketone groups (carboalkoxy) by means of hydrazides of mercapto-substituted aliphatic acids can be carried out in which the hydrazide group reacts with a ketone terminal group on a polymer chain while the mercapto group reacts with a double bond within the same or another polymer chain.

The amount of polyfunctional organic compound employed will depend on the desired degree of cross-linking and upon the molecular weight of the polymer containing the terminal reactive groups. It is preferred that the terminally reactive polymer be of the molecular weight of from 5000 to 20,000 before addition of the polyfunctional compound; however, it is within the scope of the invention to utilize polymers of much higher molecular weight. The reaction of the polyfunctional organic compound and the terminally reactive polymer can be carried out in the presence of conventional curing agents or curing system. Various curing agents can be employed for this purpose depending on the polymers which are being treated, including the peroxides such as benzoyl peroxide and dicumyl peroxide, ultraviolet and ionizing radiation, in systems employing sulfur in conjunction with other agents, including vulcanization accelerators such as tetramethylthiuram disulfide, benzothiazyl disulfide, mercaptobenzothiazole, thiocarbanilide, N-cyclohexyl-2-benzothiazylsulfenamide, N,N - dimethyl-S-tert-butylsulfenyl dithiocarbamate, and including such accelerator activators as magnesium or zinc oxide in conjunction with fatty acids, zinc stearate, magnesium stearate and the like. When a curing system is employed the reaction can be carried out over a time period of from 10 minutes to as long as 48 hours at from 125 to 375° F., the longer times being used at the lower temperatures. The use of conventional compounding agents such as fillers, pigments, such as carbon black, reinforcing agents, plasticizers and the like is within the scope of this invention.

The terminally reactive polymers of this invention are characterized by their high molecular weights and also by the wide range of molecular weight which can be obtained. Thus, these polymers can be prepared with molecular weights ranging from about 5000 to as high as 150,000 or higher. The polymers which are solids find various uses, a major use being in the preparation of polymers by reaction with polyfunctional compounds, heating, curing, etc. The polymers of this invention vary widely in their properties depending on the particular monomers and mixtures of monomers utilized in their preparation. Many of the polymers are tough, rubbery materials and others are highly elastic. Depending on their particular properties they find wide applications in the preparation of molded articles such as tires and other rubber articles; in some cases they can be extruded, calendered and otherwise treated as conventional plastics.

The following examples are presented in illustration of the invention.

EXAMPLE I

A series of runs were carried out in which terminally reactive copolymers of butadiene and styrene were prepared according to the method of this invention.

An amount of ([3-acetylphenyl]azo)3-acetylphenyl thioether was prepared by coupling diazotized m-aminoacetophenone with m-mercaptoacetophenone. The reaction product was purified by recrystallization from an ether-acetone mixture at —78° C. The thus-purified material melted with slow decomposition at 85–86.5° C.

This diazothioether was used as the initiator-modifier in a number of emulsion copolymerizations of butadiene and styrene. The following recipe was used.

*Polymerization Recipe*

| Ingredient: | Parts by weight |
|---|---|
| Butadiene | 75 |
| Styrene | 25 |
| Water | 180 |
| Sodium lauryl sulfate | 5 |
| ([3-acetylphenyl] azo) 3-acetylphenyl thioether | 0.7 |
| $KH_2PO_4$ | 0.5 |
| Temperature, 50° C. (122° F.). | |

Fifteen runs were carried out according to this recipe, and an average conversion of 63 percent was obtained at an average polymerization time of 14.9 hours. Di-tert-butyl hydroquinone was added to each of the reaction bottles in the amount of 0.2 part by weight of monomer to shortstop the reaction. Two percent by weight, based on the polymer, of phenyl-beta-naphthylamine was then added to each of the reaction mixtures. An amount of saturated aqueous NaCl solution was then added to each bottle to cream the polymer present, after which the polymer in each bottle was coagulated by adding isopropyl alcohol. The precipitated polymer was then washed with water several times, followed by an isopropyl alcohol wash, followed by a final wash with a 2 percent by weight solution of phenyl-beta-naphthylamine in isopropyl alcohol. The polymer was then dried in an air oven at 60° C. The total amount of polymer prepared was 975 grams. This polymer was gel free, had an inherent viscosity of 1.93 and a Mooney viscosity (ML–4) of 47.0.

The polymer which was prepared by the above described emulsion polymerization was then cured by reaction with 12-mercaptostearohydrazide.

The curing compound was prepared in the following manner. Ethyl 12-mercaptostearate was prepared by esterification of 12-mercaptostearic acid with ethanol. This ester was then reacted with hydrazine to form 12-mercaptostearohydrazide. Analysis of this compound showed 42.5 percent purity.

The compounding recipe for this curing step was as follows. A compounding recipe for an emulsion-polymerized butadiene/styrene copolymer is included for comparison.

*Compounding Recipe*

| Ingredien | Parts by weight | |
|---|---|---|
| | A | B (control) |
| Terminally reactive polymer | 100 | 0 |
| Emulsion-polymerized butadiene/styrene copolymer | 0 | 100 |
| High abrasion furnace black | 50 | 50 |
| Zinc oxide | 3 | 3 |
| Stearic acid | 5 | 0 |
| Extender-softener [1] | 10 | 10 |
| Sulfur | 1.75 | 1.75 |
| Vulcanization accelerator [2] | 1.0 | 1.0 |
| 12-Mercaptostearohydrazide | 3 | 3 |

[1] Circopara—50% special heavy hydrocarbon and 50% of a saturated polymerized hydrocarbon.
[2] N-cyclohexyl-2-benzothiazylsulfenamide.

These polymers were then cured at 307° F. for varying lengths of time. The results of these runs are given below as Table I.

TABLE I

|  | Terminally reactive polymer, recipe A | Control, recipe B |
|---|---|---|
| 30 minute cure, dynamic modulus, p.s.i. (10%):[11] | | |
| Initial | 159 | 108.4 |
| Final | 126.7 | 89.5 |
| Percent permanent set [11] | 2.4 | 3.6 |
| Static p.s.i. (10%)[12] | 46.0 | 40.9 |
| $V_r$:[13] | | |
| At 20 min. cure | .387 | .382 |
| At 30 min. cure | .399 | .386 |
| At 45 min. cure | .403 | .387 |
| At 75 min. cure | .400 | .388 |
| $\nu \times 10^4$: | | |
| At 20 min. cure | 1.17 | 1.12 |
| At 30 min. cure | 1.31 | 1.16 |
| At 45 min. cure | 1.37 | 1.17 |
| At 75 min. cure | 1.33 | 1.18 |
| Oven aged for 24 hours | | |
| 30 minute cure: | | |
| Modulus [3] | 2,100 | 1,840 |
| Tensile, p.s.i.[3] | 2,500 | 2,850 |
| Elongation, percent [3] | 330 | 400 |
| 75 minute cure: | | |
| Modulus [3] | 1,880 | 1,680 |
| Tensile, p.s.i.[3] | 2,540 | 2,800 |
| Elongation [3] | 365 | 440 |

|  | Terminally reactive polymer, recipe A | Control, recipe B |
|---|---|---|
| Hysteresis (ΔT, °F.)[5] | 61.2 | 73.3 |
| Resilience, percent [6] | 64.2 | 55.7 |
| Modulus, after curing [3] for— | | |
| 20 minutes | 1,680 | 1,100 |
| 30 minutes | 1,480 | 1,230 |
| 40 minutes | 1,360 | 1,200 |
| 75 minutes | 1,450 | 1,150 |
| Tensile, after curing [3] for— | | |
| 20 minutes | 3,080 | 2,430 |
| 30 minutes | 2,780 | 2,900 |
| 45 minutes | 2,790 | 2,430 |
| 75 minutes | 2,710 | 2,480 |
| Elongation, after curing [3] for— | | |
| 20 minutes | 480 | 520 |
| 30 minutes | 450 | 560 |
| 45 minutes | 480 | 490 |
| 75 minutes | 470 | 510 |
| Compression set [2] | 19.2 | 15.9 |
| Shore A hardness [8] | 62.5 | 61.0 |

For footnotes 2, 3, 5, 6, 8, 11, 12, and 13 see Test Procedures, column 11 is reacted with the terminally reactive polymer. Significant differences in other properties of the polymers are also noted.

EXAMPLE II

A series of runs were carried out in which terminally reactive polymers containing terminal ester groups were prepared.

Methyl thiosalicylate was prepared by passing anhydrous HCl through a refluxing solution of o-mercaptobenzoic acid in methanol. Mercaptan analysis of the middle fraction (B.P. 118–125 at 3–4 mm. Hg absolute) showed the purity to be 98.8 percent. Ethyl p-aminobenzoate was prepared by refluxing a mixture of p-aminobenzoic acid in ethanol which was saturated with anhydrous HCl. This ester was then diazotized and coupled with methyl thiosalicylate to form methyl([4-carbethoxyphenyl] azo) 2-carbmethoxyphenyl thioether. This compound was then used as the initiator-modifier in several emulsion polymerization runs.

In these polymerization runs some runs were made using only the diazothioether as the initiator while in some of the runs, a supplemental initiator was employed. These runs were carried out according to the following recipe.

*Polymerization Recipe*

Ingredient:

| Butadiene | Parts by weight | 75. |
|---|---|---|
| Styrene | do | 25. |
| Water | do | 180. |
| Potassium fatty acid soap (K–FA) | do | 0 or 5. |
| Sodium lauryl sulfate | do | Do. |
| Diazothioether (DTE) | do | Variable. |
| Na₃PO₄ | do | Do. |
| NaH₂PO₄ | do | Do. |
| K₃Fe(CN)₆ | do | Do. |
| Temperature | °C | 50 (122° F.). |
| Time | hours | Variable. |

The results of the runs made according to this recipe are expressed below as Table II.

TABLE II

| Run No. | KFA, parts | Sodium lauryl sulfate, parts | DTE, parts | Na₃PO₄, parts | Na₂HPO₄, parts | NaH₂PO₄, parts | K₃Fe-(CN)₆, parts | Time, hours | pH | Conversion, percent |
|---|---|---|---|---|---|---|---|---|---|---|
| 1 | 5 | 0 | 1 | | | | | 19 | | 24 |
| 2 | 5 | 0 | 2 | | | | | 19 | | 24 |
| 3 | 5 | 0 | 4 | | | | | 19 | | 27 |
| 4 | 5 | 0 | 4 | | | | 0.4 | 19 | | 16 |
| 5 | 0 | 5 | 2 | 2.5 | | | | 19 | 11.8 | 4 |
| 6 | 0 | 5 | 2 | | 2.5 | | | 19 | 9.4 | 20 |
| 7 | 0 | 5 | 2 | | | 2.5 | | 19 | 5.2 | 53 |
| 8 | 0 | 5 | 2 | | | | 0.4 | 19 | | 22 |
| 9 | 0 | 5 | 2 | | | | | 19 | | 21 |
| 10 | 0 | 5 | 2 | 1.0 | | | | 97 | | 36 |
| 11 | 0 | 5 | 2 | 0.8 | | 0.2 | | 97 | | 67 |
| 12 | 0 | 5 | 2 | 0.6 | | 0.4 | | 97 | | 61 |
| 13 | 0 | 5 | 2 | 0.4 | | 0.6 | | 97 | | 60 |
| 14 | 0 | 5 | 2 | 0.2 | | 0.8 | | 97 | | 64 |
| 15 | 0 | 5 | 2 | | | 1.0 | | 97 | | 67 |

It is noted that in Table I the degree of curing ($\nu \times 10^4$) is substantially greater when 12-mercaptostearohydrazide Another series of runs was made in which 2-carbmethoxyphenyl thioether was employed as the initiator-modifier in an emulsion polymerization of butadiene. The recipe for these runs was as follows.

*Recipe*

Ingredient:
| Butadiene | parts by weight | 100 |
| Water | do | 180 |
| Sodium lauryl sulfate | do | 5 |
| Diazothioether | do | 8 |
| $NaH_2PO_4$ | do | 1 |
| Temperature | °C | 50 |
| Time | hours | 30.25 |

The conversion in this run was 35 percent, and the polymer after coagulation as described in Example I was gel free and had an inherent viscosity of 0.57. A sample of this polymer was subjected to infrared scanning after first reprecipitating the polymer six times from benzene solution with isopropyl alcohol. The infrared scanning confirmed the presence of ester groups.

A polymerization run was carried out in which butadiene and styrene were copolymerized using ([3-acetylphenyl] azo) 3-acetylphenyl thioether as in Example I. The recipe for this run was identical to that of Example I. The polymer, recovered by the method of Example I, had an inherent viscosity of 0.96 and no gel. This polymer was then dissolved in a 2:1 mixture of benzene and pyridine, after which it was reacted with semicarbazide and then with increasing quantities of formaldehyde. The results of these runs are expressed below as Table III. In Table III the mole ratios of reactants to polymer were calculated on the basis of one ketone group being located at each end of each polymer chain.

TABLE III

| Run No. | Mole ratio, semicarbazide/polymer | Mole ratio, formaldehyde/semicarbazide | Gel, percent | Inherent viscosity [14] |
|---|---|---|---|---|
| 16 | 8.4/.084 | 0/8.4 | Trace | 0.77 |
| 17 | 8.4/.084 | 6/8.4 | Trace | 0.97 |
| 18 | 8.4/.084 | 12/8.4 | 48 | 0.70 |
| 19 | 8.4/.084 | 18/8.4 | 56 | 4.20 |
| 20 | 8.4/.084 | 24/8.4 | 62 | Not measured |

See Test Procedures, column 11 for footnote 14.

It is apparent from Table III that increasing the ratio of formaldehyde to semicarbazide has an important effect on the coupling reaction with the terminally reactive polymer.

EXAMPLE III

Two runs were carried out in which terminally reactive copolymers of butadiene and styrene were prepared by the procedure of Example I. The polymerization recipes for these runs were as follows:

*Polymerization Recipes*

| Ingredient | C | D |
|---|---|---|
| Butadiene parts by weight | 75 | 75 |
| Styrene do | 25 | 25 |
| Water do | 180 | 180 |
| Sodium lauryl sulfate do | 5 | 5 |
| (3-acetylphenylazo)-3-acetoxyphenyl thioether parts by weight | 0.7 | 0.7 |
| $KH_2PO_4$ do | 0.5 | 0.5 |
| Temperature °C | [1] 50 | 50 |
| Time hours | 15.6 | 13.25 |
| Conversion percent | 66 | 65 |

[1] 122° F.

These polymerizations were each shortstopped by the addition of 0.2 part/100 parts monomer of di-tert-butyl-hydroquinone. The polymers from each run were then coagulated with 2 percent by weight, based on the rubber, of phenyl-beta-naphthylamine. The polymer from recipe C had an inherent viscosity of 2.05, zero gel, and a Mooney viscosity (ML-4) of 52. The polymer from recipe D had an inherent viscosity of 1.98, zero gel, and a Mooney viscosity (ML-4) of 51.

These two polymers were then blended together, using 944 grams of polymer from recipe C and 927 grams from recipe D. Various portions of this blend were then compounded according to the following compounding recipes:

*Compounding Recipes*

| | 1 | 2 | 3 | 4 |
|---|---|---|---|---|
| Terminally reactive polymer | 100 | 100 | 100 | 100 |
| High abrasion furnace black | 50 | 50 | 50 | 50 |
| Zinc oxide | 3 | 3 | 3 | 3 |
| Stearic acid | 5 | 5 | 5 | 5 |
| Antioxidant [1] | 1 | 1 | 1 | 1 |
| Extender oil [2] | 10 | 10 | 10 | 10 |
| Sulfur | 1.5 | 1.5 | 1.75 | 1.75 |
| N-cyclohexyl-2-benzothiazylsulfenamide | 1.0 | 1.0 | 1.0 | 1.0 |
| 12-mercaptostearohydrazide | 2 | 4 | 2 | 4 |

[1] Physical mixture containing 65 weight percent of a complex diarylamine-ketone reaction product and 35 weight percent of N,N'-diphenyl-p-phenylenediamine.
[2] Highly aromatic rubber extender sold under the trademark of Philrich 5. Typical analysis—API gravity 11.6, viscosity—175 SUV seconds at 210° F., and 110° F. aniline point.

These compounded rubbers were then cured for 30 minutes at 307° M., after which the physical properties were determined. The results are expressed below as Table IV.

TABLE IV

| Property | Polymer from recipe | | | |
|---|---|---|---|---|
| | 1 | 2 | 3 | 4 |
| $\nu \times 10^4$, moles/cc.[1] | 1.15 | 1.29 | 1.40 | 1.49 |
| Compression set, percent [2] | 21.1 | 25.0 | 20.2 | 23.3 |
| 300% modulus, p.s.i.[3] | 1,480 | 1,820 | 1,750 | 2,220 |
| Tensile, p.s.i.[3] | ᵃ3,200 | 3,430 | 3,270 | ᵃ3,385 |
| Elongation, percent [3] | ᵃ525 | 465 | 460 | ᵃ425 |
| 200° F. max. tensile, p.s.i.[3] | 1,325 | 1,410 | 1,480 | 1,680 |
| Tear resistance, #/in.[4] | 260 | 260 | 230 | 225 |
| Hysteresis, ΔT, °F.[5] | 57.5 | 56.5 | 51.5 | 52.7 |
| Resilience, percent [6] | 62.4 | 64.1 | 66.7 | 69.8 |
| Flex life, thousands of flexures [7] | 4.4 | 6.3 | 4.4 | 6.0 |
| Shore hardness (A)[8] | 60 | 62.5 | 61.5 | 64 |
| NBS abrasion, rev./mil [9] | 14.76 | 14.02 | 17.43 | 14.76 |
| Angle abrasion loss, grams [10] | 7.15 | 6.01 | 6.20 | 5.46 |
| Oven aged 24 hours at 212° F.: | | | | |
| 300% modulus, p.s.i.[3] | 2,220 | 2,640 | 2,380 | 2,990 |
| Tensile, p.s.i.[3] | 2,700 | 2,760 | ᵃ3,000 | 3,410 |
| Elongation, percent [3] | 350 | 320 | 360 | 330 |
| Hysteresis, ΔT, °F.[5] | 50.7 | 53.7 | 46.9 | 51.7 |
| Resilience, percent [6] | 71.1 | 74.1 | 73.6 | 75.6 |
| Flex life, thousands of flexures [7] | 2.6 | 1.2 | 1.6 | 1.2 |
| Shore hardness (A)[8] | 65.0 | 68.5 | 66.5 | 69.0 |
| NBS abrasion, rev./mil.[9] | 18.54 | 19.29 | 20.51 | 17.58 |
| Angle abrasion loss, grams [10] | 6.20 | 5.90 | 5.81 | 5.95 |

ᵃ Estimated.
For footnotes 1 through 10 see Test Procedures, column 11.

EXAMPLE IV

The terminally reactive polymer which was prepared in Example I (of the disclosure) was compounded and cured, and the physical properties of the cured stocks were determined. The compounding recipes were as follows. Two control runs wherein a butadiene/styrene emulsion copolymer was cured are included.

*Compounding Recipes*

| Ingredient | Parts by weight | | | |
|---|---|---|---|---|
| | 9 | 10 | 11 | 12 |
| Terminally reactive polymer from Example I | 100 | 100 | | |
| Butadiene/styrene copolymer [1] | | | 100 | 100 |
| High abrasion furnace black | 50 | 50 | 50 | 50 |
| Zinc oxide | 3 | 3 | 3 | 3 |
| Stearic acid | 5 | 5 | | |
| Extender [2] | 10 | 10 | 10 | 10 |
| Sulfur | 1.75 | 1.75 | 1.75 | 1.75 |
| N-cyclohexyl-2-benzothiazylsulfenamide | 1.0 | 1.0 | 1.0 | 1.0 |
| 12-Mercaptostearohydrazide | 3 | | 3 | |

[1] 75/25 butadiene/styrene copolymer which was prepared by an emulsion polymerization at 122° F. using a fatty acid soap, and sold under the trademark of Philprene 1000.
[2] Hydrocarbon oil rubber extender sold under the tradename of Circo-Para.

These compounded rubbers were then cured for 30 minutes at 307° F. except for the tear resistance test and the NBS abrasion test. The samples for these two tests were cured for 45 minutes at 307° F. The physical properties of the cured stocks are expressed below as Table V.

TABLE V

| Property | Polymer from Recipe | | | |
|---|---|---|---|---|
| | 9 | 10 | 11 | 12 |
| $\nu \times 10^4$, moles/cc.[1] | 1.31 | 1.09 | 1.16 | 1.25 |
| Compression set, percent [2] | 19.2 | 20.4 | 15.9 | 20.3 |
| 300% modulus, p.s.i.[3] | 1,480 | 1,100 | 1,230 | 1,230 |
| Tensile, p.s.i.[3] | 2,780 | 2,400 | 2,900 | 2,840 |
| Elongation, percent [3] | 450 | 490 | 560 | 520 |
| 200° F. maximum tensile, p.s.i.[3] | 1,220 | 1,205 | 1,150 | 1,245 |
| Tear resistance, #/in.[4] | 245 | 295 | 295 | 245 |
| Hysteresis, $\Delta T$, ° F.[5] | 61.2 | 70.3 | 73.3 | 68.3 |
| Resilience, percent [6] | 64.2 | 57.9 | 55.7 | 57.4 |
| Shore A hardness [8] | 62.5 | 58 | 61 | 58.5 |
| NBS abrasion, rev./mil.[9] | 8.78 | 10.26 | 6.08 | 9.31 |
| Oven aged 24 hours at 212° F.: | | | | |
| 300% modulus, p.s.i.[3] | 2,100 | 2,072 | 1,840 | 2,220 |
| Tensile, p.s.i.[3] | 2,490 | 2,070 | 2,840 | 2,760 |
| Elongation, percent [3] | 330 | 360 | 410 | 350 |

For footnotes 1, 2, 3, 4, 5, 6, 8, and 9 see Test Procedures, column 11.

In the above table it is noted that the degree of curing ($\nu \times 10^4$) is substantially greater in the terminally reactive polymer containing 12-mercaptostearohydrazide (run 9) than in the same polymer without this compound (run 10). On the other hand the non-terminally reactive polymer containing this compound was cured less than the same polymer which did not contain this compound.

TEST PROCEDURES (Tables I, III, IV, and V)

[1] Determined by the swelling method of Kraus as given in Rubber World, October 1956. This value is the number of effective network chains per unit volume of rubber. The higher the number, the more the rubber is crosslinked (vulcanized).
[2] ASTM D-395-55, Method B, using 0.325 in. spacers, 2 hours at 212° F., followed by 1 hour relaxation at 212° F.
[3] ASTM D-412-51T.
[4] ASTM D-624-54.
[5] ASTM D-623-52T, Method A, Goodrich flex meter.
[6] ASTM D-945-55T.
[7] ASTM D-813-57T.
[8] ASTM D-676-55T.
[9] ASTM D-394-47.
[10] This test is carried out by noting the average weight loss of 8 doughnut shaped wheels which have each undergone 3,000 revolutions while being subjected to the abrasive action of a Carborundum wheel. This test is carried out on a Goodyear-Huber abrader, using a 15 degree angle of contact between Carborundum and rubber, and using a 24" diameter, 1½ inch thick, grade M, vitreous, 36 grain size Carborundum (Norton Co.).
[11] ASTM D-623-52T.
[12] ASTM D-945-52T.
[13] Reciprocal swelling ratio determined by method described in Rubber World, 135, No. 1, 67–73 (1956).
[14] Inherent viscosity was determined as follows: One tenth gram of polymer was placed in a wire cage made from 80 mesh screen and the cage was placed in 100 ml. of toluene contained in a wide-mouth 4-ounce bottle. After standing at room temperature (approximately 25° C.) for 24 hours, the cage was removed and the resulting solution was filter through a C porosity sulfur absorption tube to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample. In instances where the polymer was of low molecular weight (inherent viscosity below 0.5), a 0.3 gram sample was used for the determination instead of 0.1 gram.

Having thus described the invention by providing specific examples thereof it is to be understood that no undue limitations or restrictions are to be drawn by reason thereof and that many variations and modifications are within the scope of the invention.

We claim:
1. A process which comprises preparing a polymer selected from the group consisting of homopolymers of conjugated dienes and copolymers of conjugated dienes with vinylidene compounds by emulsion polymerization at a temperature in the range of about 10 to 175° F. in the presence of about 0.05 to 5 parts by weight per 100 parts of monomer of a diazothioether having the formula

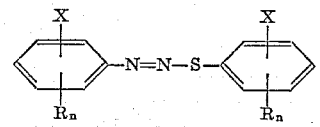

wherein each X is an acyl radical containing not more than 10 carbon atoms; R is an alkyl group containing from 1 to 3 carbon atoms and $n$ is an integer from 0 to 2, and in the absence of auxiliary modifiers, reacting said polymer at a temperature above −100° F. with about 0.5 to 5 equivalents of a polyfunctional organic compound selected from the group consisting of amines, hydrazides of mercapto-substituted aliphatic acid, semicarbazides, and thiosemicarbazides capable of reacting with X and recovering a polymer product.

2. The process of claim 1 in which the polymer is a homopolymer of butadiene.

3. The process of claim 1 in which the polymer is a homopolymer of isoprene.

4. The process of claim 1 in which the polymer is a copolymer of butadiene and styrene.

5. The process of claim 1 wherein said reacting of the polymer and polyfunctional organic compound is carried out in the presence of a conventional curing system.

6. A polymer prepared by the process of claim 1.

7. A process which comprises preparing a copolymer of butadiene and styrene by emulsion polymerization at a temperature of from about 10 to 175° F. in the presence of between about 0.05 and about 5.0 parts by weight per 100 parts of said comonomers of ([3-acetylphenyl]azo) 3-acetylphenyl thioether and in the absence of auxiliary modifiers reacting said polymer with between about 0.5 and about 5 equivalents of 12-mercaptostearohydrazide based on the ([3-acetylphenyl]azo) 3-acetylphenyl thioether at a temperature of between about −100 and about 350° F. and recovering a polymer product.

8. A polymer prepared by the process of claim 7.

9. A process which comprises preparing a copolymer of butadiene and styrene by emulsion polymerization at a temperature of from about 10 to 175° F. in the presence of between about 0.05 and about 5.0 parts by weight per 100 parts of said comonomers of ([3-acetylphenyl]azo) 3-acetylphenyl thioether, and in the absence of auxiliary modifiers, reacting said polymer with between about 0.5 to 5 equivalents of 12-mercaptostearohydrazide based on the ([3-acetylphenyl]azo) 3-acetylphenyl thioether at a temperature in the range of between about 125 and about 375° F. in the presence of a conventional curing system comprising sulfur and recovering a polymer product.

10. A polymer prepared by the process of claim 5.

11. A polymer prepared by the process of claim 9.

12. A process which comprises preparing a copolymer of butadiene and styrene by emulsion polymerization at a temperature of from about 10 to 175° F. in the presence of between about 0.05 and about 5.0 parts by weight per 100 parts of said comonomers of ([3-acetylphenyl]azo) 3-acetylphenyl thioether, and in the absence of auxiliary modifiers, reacting said polymer with between about 0.5 and about 5 equivalents of semicarbazide based on the ([3-acetylphenyl]azo) 3-acetylphenyl thioether and between about 1.5 and about 10 mols of formaldehyde per mole of semicarbazide at a temperature of between about −100 and about 350° F. and recovering a polymer product.

13. A process which comprises preparing a copolymer of butadiene and styrene by emulsion polymerization at a temperature of from about 10 to 175° F. in the presence of between about 0.05 and about 5.0 parts by weight per 100 parts of said comonomers of ([3-acetylphenyl]azo) 3-acetylphenyl thioether, and in the absence of auxiliary modifiers, reacting said polymer with between about 0.5 to 5 equivalents of semicarbazide based on the ([3-acetylphenyl]azo) 3-acetylphenyl thioether and between about 1.5 and about 10 mols of formaldehyde per mol of semicarbazide at a temperature in the range of between about 125 and about 375° F. in the presence of a conventional curing system comprising sulfur and recovering a polymer product.

14. A polymer prepared by the process of claim 12.

15. A process prepared by the process of claim 13.

16. A process which comprises preparing a polymer selected from the group consisting of homopolymers of conjugated dienes and copolymers of conjugated dienes with vinylidene compounds by emulsion polymerization at a temperature of about 10 to 175° F. in the presence of about 0.05 to 5 parts by weight per 100 parts of monomers of ([3-acetylphenyl]azo) 3-acetylphenyl thioether and in the absence of auxiliary modifiers, reacting said polymer with between about 0.5 and about 5 equivalents of 12-mercaptostearohydrazide based on the ([3-acetylphenyl]azo) 3-acetylphenyl thioether at a temperature of about −100 to 350° F. and recovering a polymer product.

17. A process which comprises preparing a polymer selected from the group consisting of homopolymers of conjugated dienes and copolymers of conjugated dienes with vinylidene compounds by emulsion polymerization at a temperature in the range of about 10 to 175° F. in the presence of about 0.05 to 5 parts by weight per 100 parts of monomer of a diazothioether having the formula

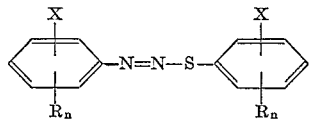

wherein each X is an acyl radical containing not more than 10 carbon atoms; R is an alkyl group containing from 1 to 3 carbon atoms and $n$ is an integer of from 0 to 2, and in the absence of auxiliary modifiers, reacting said polymer at a temperature above −100° F. with about 0.5 to 5 equivalents of a hydrazide of a mercapto-substituted aliphatic acid capable of reacting with X, and recovering a polymer product.

18. A process which comprises preparing a polymer selected from the group consisting of homopolymers of conjugated dienes and copolymers of conjugated dienes with vinylidene compounds by emulsion polymerization at a temperature of about 10 to 175° F. in the presence of about 0.05 to 5 parts by weight per 100 parts of monomers of ([3-acetylphenyl]azo)3-acetylphenyl thioether and in the absence of auxiliary modifiers, reacting said polymer with between about 0.5 and about 5 equivalents of a polyfunctional organic compound selected from the group consisting of amines, hydrazides of mercapto-substituted aliphatic acids, semicarbazides, and thiosemicarbazides capable of reacting with the acetyl group in said polymer at a temperature of about −100 to 350° F., and recovering a polymer product.

19. A process which comprises preparing a polymer selected from the group consisting of homopolymers of conjugated dienes and copolymers of conjugated dienes with vinylidene compounds by emulsion polymerization at a temperature of about 10 to 175° F. in the presence of about 0.05 to 5 parts by weight per 100 parts of monomers of ([3-acetylphenyl]azo)3-acetylphenyl thioether and in the absence of auxiliary modifiers, reacting said polymer with between about 0.5 and about 5 equivalents of a hydrazide of a mercapto-substituted aliphatic acid capable of reacting with the acetyl group in said polymer at a temperature of about −100° to 350° F., and recovering a polymer product.

References Cited in the file of this patent

UNITED STATES PATENTS

| | | |
|---|---|---|
| 2,501,692 | Reynolds | Mar. 28, 1950 |
| 2,546,220 | Fryling et al. | Mar. 27, 1951 |
| 2,595,892 | Schulze | May 6, 1952 |
| 2,625,537 | Kolthoff et al. | Jan. 13, 1953 |
| 2,877,212 | Seligman | Mar. 10, 1959 |

OTHER REFERENCES

Bamford et al.: Nature, vol. 176, No. 4471, July 9, 1955, page 78.

Bovey et al.: Emulsion Polymerization, Interscience Publishers, Inc., New York, 1955, page 140 relied upon.